United States Patent
Tange et al.

(10) Patent No.: US 9,278,387 B2
(45) Date of Patent: Mar. 8, 2016

(54) METHOD FOR MANUFACTURING LEAF SPRINGS

(75) Inventors: Akira Tange, Yokohama-Shi (JP);
Kiyoshi Kurimoto, Yokohama-Shi (JP);
Yurika Goto, Yokohama-Shi (JP); Iwao Shigeoka, Tokyo (JP); Tadakazu Kato, Tokyo (JP); Shinichi Inoguchi, Tokyo (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 650 days.

(21) Appl. No.: 13/702,510

(22) PCT Filed: May 12, 2011

(86) PCT No.: PCT/JP2011/060966
§ 371 (c)(1),
(2), (4) Date: Dec. 20, 2012

(87) PCT Pub. No.: WO2011/155283
PCT Pub. Date: Dec. 15, 2011

(65) Prior Publication Data
US 2013/0111961 A1    May 9, 2013

(30) Foreign Application Priority Data
Jun. 7, 2010  (JP) ................. 2010-129768

(51) Int. Cl.
| | |
|---|---|
| *B21D 53/18* | (2006.01) |
| *B24C 1/10* | (2006.01) |
| *B24C 3/32* | (2006.01) |
| *F16F 1/18* | (2006.01) |
| *B21D 53/88* | (2006.01) |

(52) U.S. Cl.
CPC ............... *B21D 53/886* (2013.01); *B24C 1/10* (2013.01); *B24C 3/325* (2013.01); *F16F 1/18* (2013.01); *F16F 2226/00* (2013.01)

(58) Field of Classification Search
CPC ............... F16F 1/02; F16F 1/027; F16F 1/18; F16F 1/26; F16F 1/28; F16F 2226/00; B24C 1/10; B24C 1/04; B24C 3/325; B21D 53/886; C21D 7/06; B05D 2259/00; B24B 19/26
See application file for complete search history.

(56) References Cited

FOREIGN PATENT DOCUMENTS

| JP | S6478763 | * | 3/1989 |
|---|---|---|---|
| JP | 05138535 A | * | 6/1993 |
| JP | A-05-138535 | | 6/1993 |

(Continued)

OTHER PUBLICATIONS

Jul. 19, 2011 International Search Report issued in International Application No. PCT/JP2011/060966 (with translation).

*Primary Examiner* — Alexander P Taousakis
*Assistant Examiner* — Gregory Swiatocha
(74) *Attorney, Agent, or Firm* — Oliff PLC (57) ABSTRACT

A method for producing a leaf spring having a leaf portion and an eye portion formed at the leaf portion including: forming a gap between a leading end of the eye and a facing surface facing the leading end, and shot peening an inner surface of the eye via a reflection member, wherein, at a cross section perpendicular to an axial direction of the eye portion, the leading end of the eye faces the facing surface so a straight line does not cross the leading end of the eye, the straight line connecting an intersection point and a center point of a reflection member surface, the intersection point being the intersection of a line perpendicular to the facing surface extending through an endpoint of the leaf side of the leading end of the eye to the surface.

4 Claims, 7 Drawing Sheets

(56) References Cited

FOREIGN PATENT DOCUMENTS

| | | |
|---|---|---|
| JP | A-06-050370 | 2/1994 |
| JP | 2002137166 A * | 5/2002 |
| JP | A-2009-107031 | 5/2009 |
| WO | WO 2009054484 A1 * | 4/2009 |

* cited by examiner

METHOD FOR MANUFACTURING LEAF SPRINGS

TECHNICAL FIELD

The present invention relates to a production method for a leaf spring having an eye portion at an end portion thereof. In particular, the present invention relates to an improvement in a shot peening method for an inner surface of the eye portion.

BACKGROUND ART

Figure 1A:
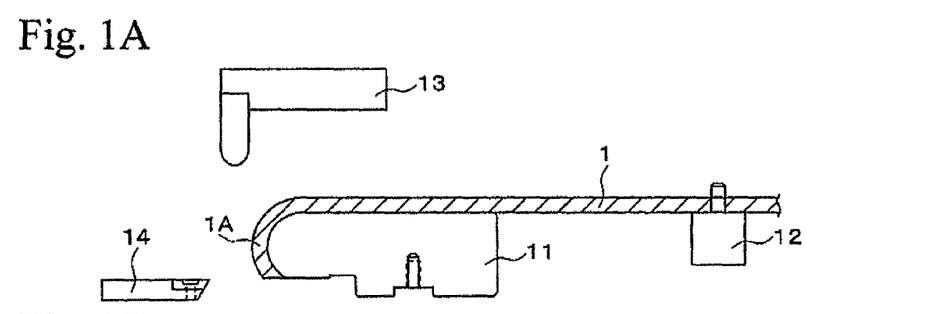
FIG. 1A is a side view which shows leading end portion cutting.
Figure 1B:
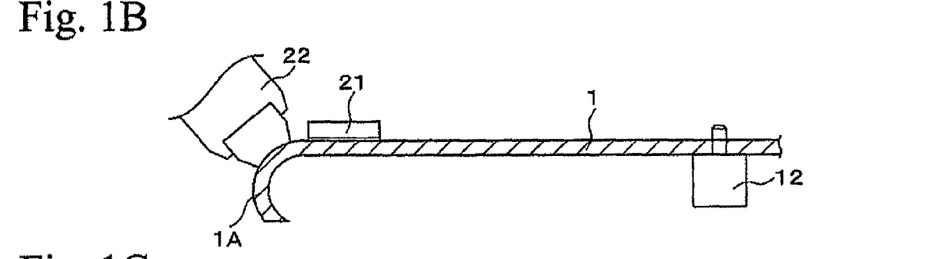
FIG. 1B is a side view which shows starting time of winding.
Figure 1C:
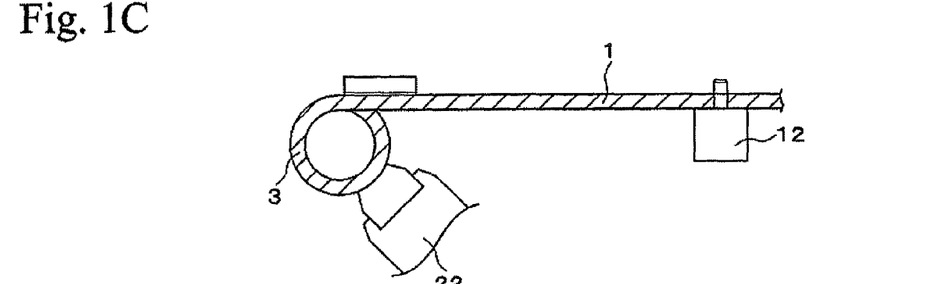
FIG. 1C is a side view which shows ending time of winding.

Leaf springs or the like are used so as to be stacked in suspension apparatuses of vehicles (trucks or the like). In a production method for this leaf spring, for example, steel is subjected to hot bending forming. FIGS. 1A to 1C are diagrams which show a schematic construction of each processing of bending forming. FIG. 1A is a diagram which shows leading end portion cutting, FIG. 1B is a diagram which shows starting time of winding, and FIG. 1C is a diagram which shows ending time of winding. In the bending forming, first, one end portion side of the steel 1 is mounted on a die 11, and the other end portion side thereof is fixed at a fixing member 12. Next, one end portion of the steel 1 is abutted and pressed by a bending member 13 from one end of a curved portion of the die 11 to the other end thereof. Thus, the one end portion of the steel 1 is bent, and a curved portion 1A is formed.

Next, as shown in FIG. 1A, one end portion of the curved portion 1A of the steel 1 is cut by a cutter 14. Next, as shown in FIG. 1B, while an upper surface of the one end portion side of the steel 1 is pressed by a pressing member 21, the curved portion 1A of the steel 1 is pressed and is wound toward the inside of the curved portion 1A by using a die 22. Thus, as shown in FIG. 1C, an eye portion 3 is formed. The above bending forming is performed on the other end portion of the steel 1, so that the steel 1, which has a leaf portion 2 and eye portions formed at both end portions of the leaf portion 2, is obtained.

Figure 2:
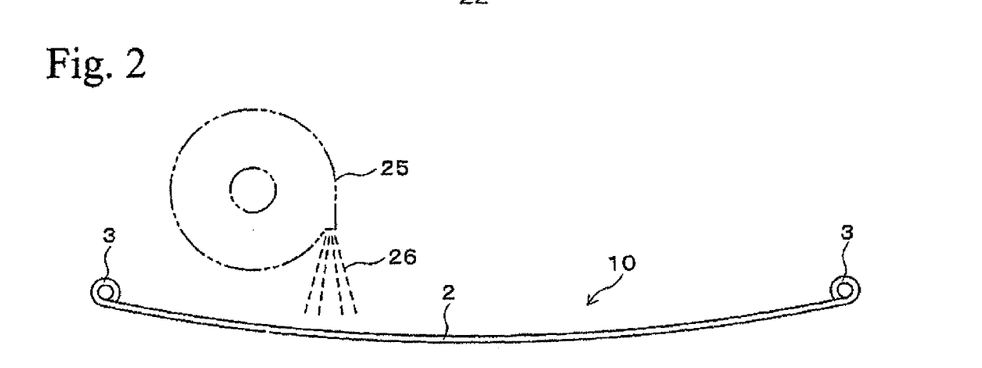
FIG. 2 is a side view which shows an overall structure of a leaf spring.

Next, the steel 1 is subjected to heating processing (quenching and tempering), so that a leaf spring 10 is obtained. Next, as shown in FIG. 2, shots are injected from an impeller 25 of a shot peening apparatus to a surface (a surface at which the eye portions 3 are formed) of the leaf portion 2 of the leaf spring 10, and the surface of the leaf portion 2 is subjected to shot peening. Thus, compressive residual stress is provided to the surface of the leaf portion 2, and the durability is improved.

Figure 3:
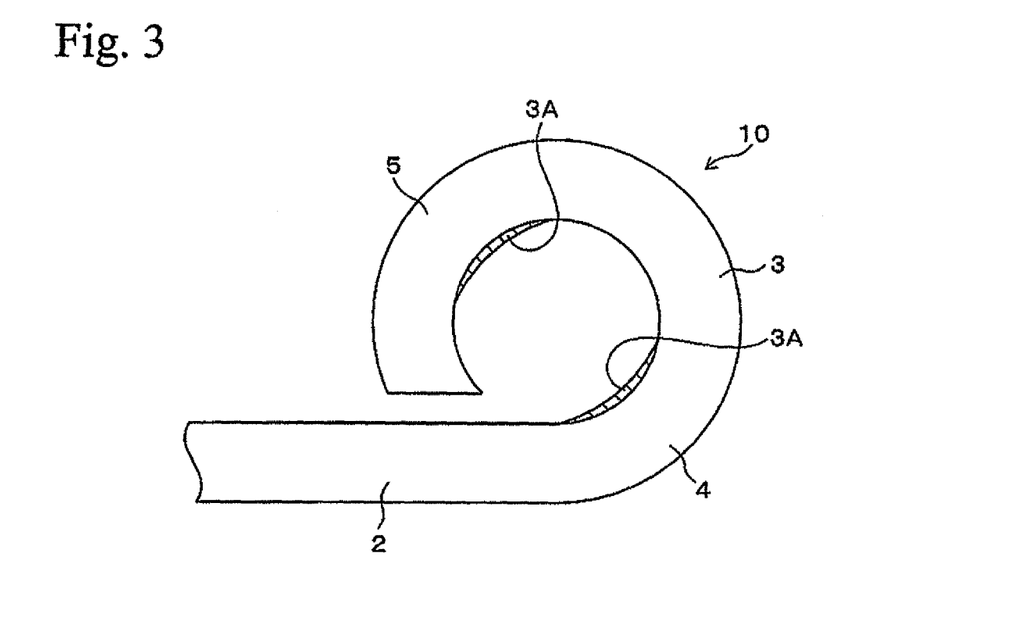
FIG. 3 is a cross sectional diagram which shows an inner surface shape of an eye portion of a leaf spring before reaming.
Figure 4:
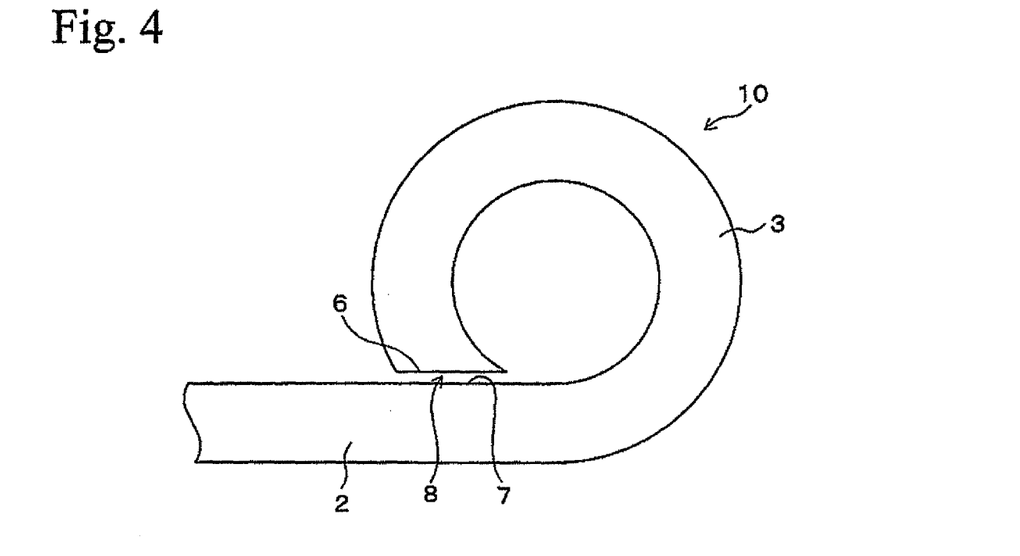
FIG. 4 is a cross sectional diagram which shows an inner surface shape of an eye portion of a leaf spring after reaming.

Next, since regarding a typical inner surface of the eye portion 3 as shown in FIG. 3, for example, a winding-start portion 4 of the inner surface of the eye portion 3 and a portion 5 facing the winding-start portion 4 have flattened shapes, an inner surface of the eye portion 3 is subjected to reaming. Thus, at least portions 3A are removed, and the inner surface of the eye portion 3 has a true circle shape, so that the leaf spring 10 shown in FIG. 4 is obtained. Next, a bushing (not shown in the Figures) is press-fitted into the inside of the eye portion 3, and the leaf spring 10 is fixed to a vehicle body (not shown in the Figures) via the bushing.

Figure 5:
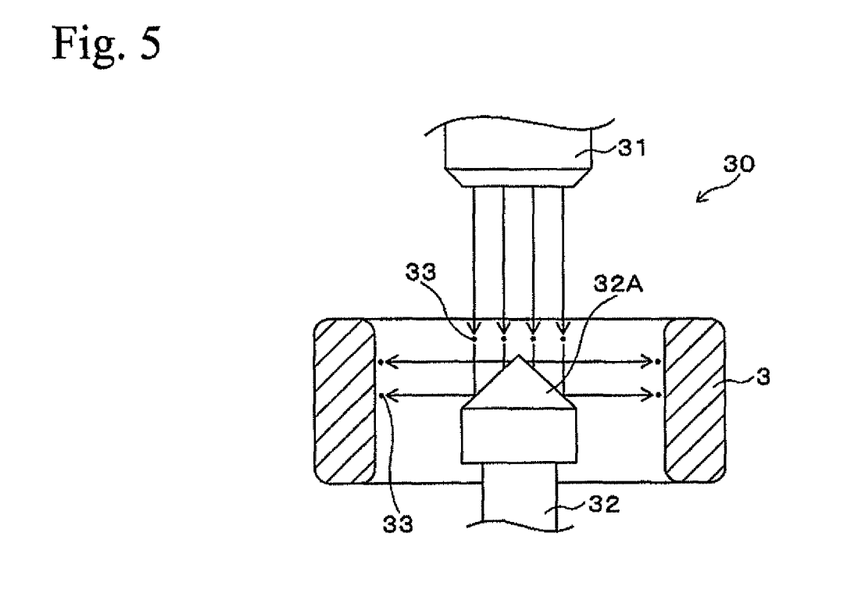
FIG. 5 is a cross sectional diagram which shows a schematic construction of shot peening apparatus for eye portion inner surfaces and which shows a condition in which shot peening is performed on an eye portion inner surface.

In recent years, the leaf spring 10 has been improved in weight reduction and high stress, so that generated stress at the eye portion 3 is increased. Thus, it has been proposed that shot peening be performed on not only the leaf portion 2 but also the inner surface of the eye portion 3, and compressive residual stress be thereby provided to the inner surface of the eye portion 3. In the shot peening to the inner surface of the eye portion 3, a shot peening apparatus 30 shown in FIG. 5 is used (see Patent Document 1, for example).

The shot peening apparatus 30 is equipped with a nozzle 31 and a reflection member 32. The nozzle 31 injects shots 33. The reflection member 32 has a reflection surface 32A reflecting the shots 33. In shot peening to the inner surface of the eye portion 3, the reflection member 32 is disposed inside the eye portion 3, the shots 33 are injected from the nozzle 31 to the reflection member 32, and the shots 33, which are reflected by the reflection surface 32A of the reflection member 32, are projected to the inner surface of the eye portion 3. In this case, the reflection member 32 is moved in the axial direction of the eye portion 3, so that the shot peening is performed on the inner surface of the eye portion 3, which extends from one opening (shot entrance side opening) to another opening (shot exit side opening) of the inner surface of the eye portion 3.

Patent Document 1 is Japanese Unexamined Patent Application Publication No. H5-138535.

DISCLOSURE OF THE INVENTION

Problems Solved by the Invention

However, the shots are not projected to the leading end portion 6 of the eye portion 3 shown in FIG. 4 and the portion 7 (facing portion 7 of the eye portion 3) facing the leading end portion 6. Due to this, a problem of durability occurs at the facing portion 7 at a gap portion 8.

Figure 6:
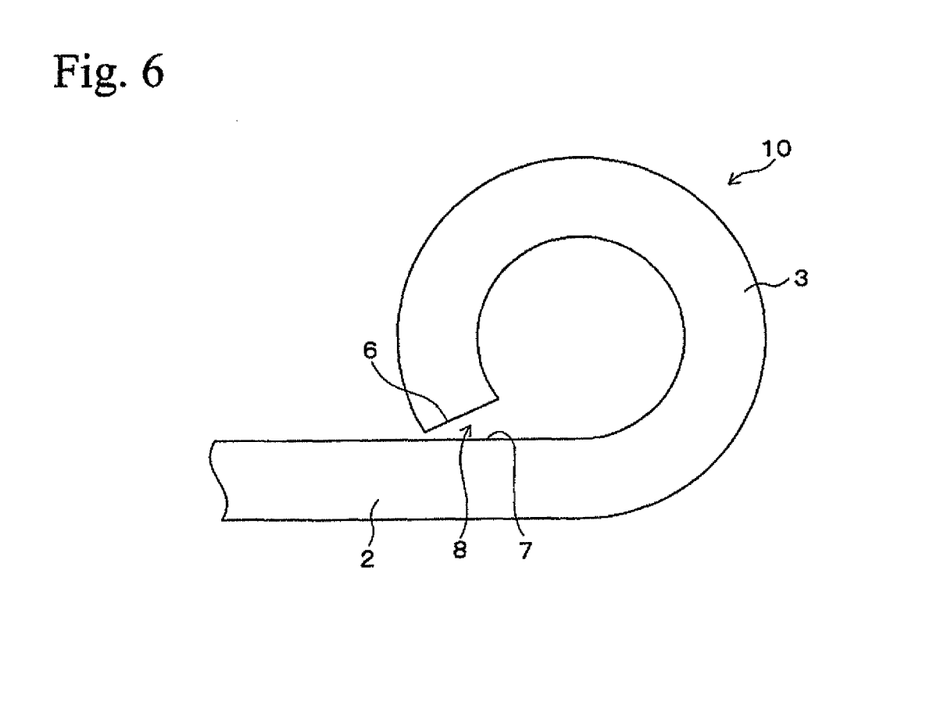
FIG. 6 is a cross sectional diagram which shows an inner surface shape of an eye portion of a leaf spring of which leading end portion is not subjected to cutting in leading end portion cutting.

On the other hand, as shown in FIG. 6, when the leading end portion 6 and the facing portion 7 are not parallel to each other, the strength for resisting the pullout load of the bush, which is press-fitted into the inside of the eye portion 3, may be weak. Due to this, when the eye portion 3 is formed, in the leading end portion cutting shown in FIG. 1A, it is necessary to cut the leading end portion by the cutter 14. As a result, the material yield may be deteriorated, and the productivity and the production cost may be increased.

An object of the present invention is to provide a production method for a leaf spring, which can improve the durability of the eye portion and the productivity and which can reduce the production cost.

Means for Solving the Problems

According to one aspect of the present invention, a production method for a leaf spring having a leaf portion and an eye portion formed at the leaf portion, includes steps of forming a gap portion between a leading end portion of the eye portion and a facing portion facing the leading end portion; shot peening at an inner surface of the eye portion by disposing a reflection member, which has a reflection surface, inside the eye portion, injecting shots from a nozzle to the reflection member, and projecting the shots, which are reflected by the reflection surface of the reflection member, to the inner surface of the eye portion, wherein in the forming of the gap portion, at a cross section perpendicular to an axial direction of the eye portion, the leading end portion of the eye portion faces the facing portion such that a straight line does not cross the leading end portion of the eye portion, the straight line connecting an intersection point and a center point of the reflection surface of the reflection member, the intersection point being between a perpendicular line and a surface of the facing portion, the perpendicular line extending from a leaf portion side end point of the leading end portion of the eye portion to the facing portion.

Figure 7A:
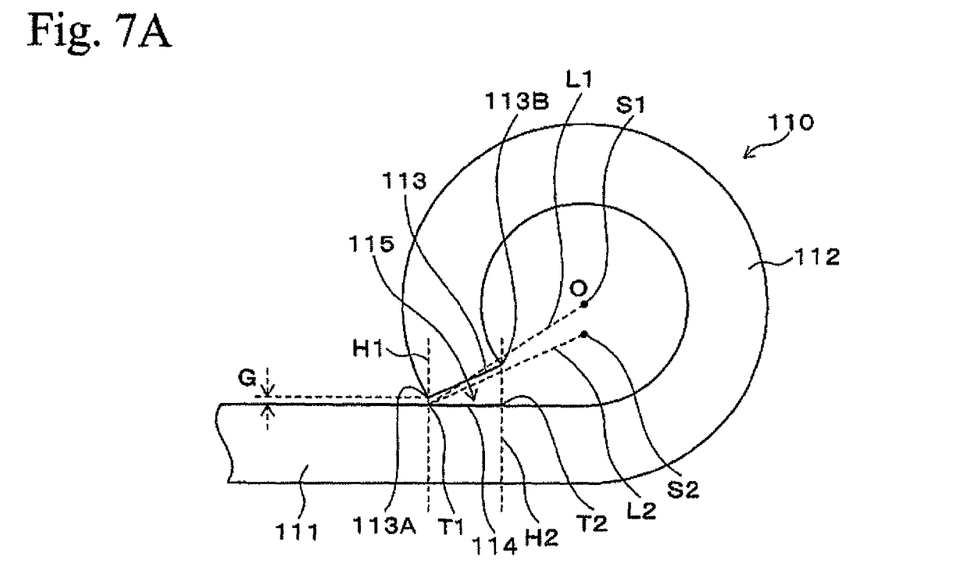
FIGS. 7A and 7B are cross sectional diagrams which show an inner surface shape of an eye portion of each specific example of leaf springs of the present invention.
Figure 7B:
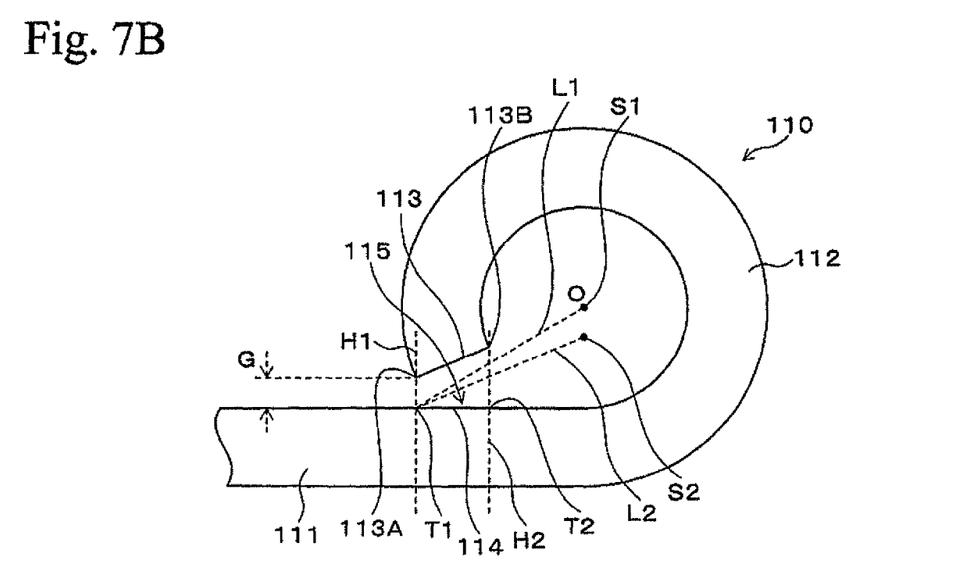

In the production method for a leaf spring according to the above aspect of the present invention, the interval of the gap portion between the leading end portion of the eye portion and the facing portion is set as follows. FIGS. 7A and 7B are diagrams which show a cross section shape of an eye portion 112 of each specific example of leaf springs of the present invention. The cross sectional shapes in FIGS. 7A and 7B are cross sectional shapes perpendicular to an axial direction of the eye portion 112.

In FIGS. 7A and 7B, reference numeral 111 denotes a leaf portion, reference numeral 113 denotes a lead end portion of the eye portion 112, reference numeral 113A denotes an end point (outside end point) of a leaf portion 111 side of the lead end portion 113, reference numeral 113B denotes an end point (inside end point) of the lead end portion 113 which is opposite to the leaf portion 111 side, reference numeral 114 denotes a facing portion (portion between intersection points T1 and T2 described below) which faces the lead end portion 113 of the eye portion 112, reference symbol O denotes a center point of the eye portion 112, reference symbols S1 and S2 denote a center point of reflection surface of a shot peening reflection member disposed inside the eye portion 112.

Reference symbol H1 denotes a perpendicular line which extends from the outside end point 113A of the leading end portion 113 to the facing portion 114 surface, reference symbol T1 denotes an intersection point between a facing portion 114 surface and the perpendicular line H1, reference symbol 1-12 denotes a perpendicular line which extends from the inside end point 113B of the leading end portion 113 to the facing portion 114 surface of the eye portion 112, and reference symbol T2 denotes an intersection point between facing portion 114 surface of the eye portion 112 and the perpendicular line H2. Reference symbol L1 denotes a line which connects the center point O of the eye portion 112 (center point S1 of the reflection surface) and the intersection point T1, reference symbol L2 denotes a line which connects the center point S2 of the reflection surface and the intersection point T1. Reference numeral 115 denotes a gap portion which is formed between the leading end portion 113 and the facing portion 114, and reference symbol O denotes an interval of the gap portion 115.

In a case in which shot peening (hereinafter referred to as "inner surface shot peening") is performed on the inner surface of the eye portion 112 in a feature shown in FIG. 7A, when the center point S1 of the reflection surface of the reflection member corresponds with the center point O of the eye portion 112, the line L1, which connects the center point S1 of the reflection surface and the intersection point T1, crosses the leading end portion 113 of the eye portion 112. Due to this, shots, which are reflected by the reflection surface of the reflection member, may collide with the inside end point 113B of the leading end portion 113, and it may be difficult for the shots to be projected to the surface of the facing portion 114 at the gap portion 115. In particular, the shots may not be projected to an outside boundary portion thereof. As a result, residual stress cannot be provided to the entire surface of the facing portion 114, so that the effects by the inner surface shot peening cannot be obtained.

In contrast, when the center point S2 of the reflection surface of the reflection member does not correspond with the center point O of the eye portion 112, and the center point S2 is positioned at a side of the facing portion 114 (at a side lower than the center point O in the Figure), the line L2, which connects the center point S2 of the reflection surface and the intersection point T1, does not cross the leading end portion 113 of the eye portion 112. Thus, shots, which are reflected by the reflection surface of the reflection member, does not collide with the inside end point 113B of the leading end portion 113, the shots are easily projected to the surface of the facing portion 114, and the shots can also reach the outside boundary portion thereof. As a result, residual stress can be provided to the entire surface of the facing portion 114 at the gap portion 115, so that the effects by the inner surface shot peening can be sufficiently obtained.

In a feature shown in FIG. 7B, the interval G of the gap portion 115 is greater than that in the feature shown in FIG. 7A. In a case in which inner surface shot peening is performed, even when the center point S1 of the reflection surface of the reflection member corresponds with the center point O of the eye portion 112, the line L1, which connects the center point S1 of the reflection surface and the intersection point T1, does not cross the leading end portion 113 of the eye portion 112. Thus, shots, which are reflected by the reflection surface of the reflection member, does not collide with the inside end point 113B of the leading end portion 113, the shots are easily projected to the surface of the facing portion 114, and the shots can also reach the outside boundary portion thereof. As a result, residual stress can be provided to the entire surface of the facing portion 114 at the gap portion 115, so that the effects by the inner surface shot peening can be sufficiently obtained.

In the feature shown in FIG. 7B, when the center point S2 of the reflection surface of the reflection member does not correspond with the center point O of the eye portion 112, and the center point S2 is positioned at a side of the facing portion 114, obviously, the line L2, which connects the center point S2 of the reflection surface and the intersection point T1, does not cross the leading end portion 113 of the eye portion 112. As a result, the effects by the inner surface shot peening can be sufficiently obtained.

In the above features, the shape and the interval G of the gap portion 115 and the center point S2 of reflection surface may be set to ones as shown in FIGS. 7A and 7B. The present invention is not limited to these, and various modifications can be used within the range of the present invention. For example, any features may be used in which the lines L1 and L2 may not cross the leading end portion 113.

As described above, in the production method for a leaf spring according to the above aspect of the present invention, in the forming of the gap portion, at a cross section perpendicular to an axial direction of the eye portion, the leading end portion of the eye portion faces the facing portion such that the straight line does not cross the leading end portion of the eye portion. In this case, the straight line connects an intersection point and a center point of the reflection surface of the reflection member, the intersection point being between a perpendicular line and a surface of the facing portion, the perpendicular line extending from a leaf portion side end point of the leading end portion of the eye portion to the facing portion. Thus, shots, which are reflected by the reflection surface of the reflection member in the shot peening, does not collide with the inside end point of the leading end portion, the shots are easily projected to the surface of the facing portion, and the shots can also reach the outside boundary portion thereof.

As a result, residual stress can be provided to the entire surface of the facing portion at the gap portion, so that the effects by the inner surface shot peening can be sufficiently obtained. Therefore, the durability of the leaf spring can be improved, so that breakage of the leaf spring can be prevented. The interval of the gap can be set at a larger value. In this case, when the leaf portion is subjected to typical shot peening, the shots can also be projected to the surface of the facing portion at the gap portion, so that the durability of the leaf spring can be further improved. As a result, breakage of the leaf spring can be effectively prevented. In the forming of the eye portion, the cutting of the leading end portion is unnecessary, so that the productivity can be improved, and the production cost can be reduced.

The production method for a leaf spring according to the above aspect of the present invention can use various structures. According to a desirable embodiment of the present invention, in order to use the feature in which the straight line connecting the center point of the reflection surface and the intersection point may not cross the leading end portion of the eye portion, at the cross section of the eye portion, in the reflection member, the center point of the reflection surface may be positioned more proximate to the facing portion than a center point of the eye portion.

The reflection surface of the reflection member may have a shape (for example, conical shape) which is symmetrical about a center point thereof. It is desirable that incident angle of shot in shot peening be 30 degrees or more. Thus, in a feature in which an angle (shown in FIGS. 7A and 7B) is set between the line, which connects the center point of the reflection surface and the intersection point, and the surface of the facing portion, it is desirable that the angle between the line L1, which connects the center point S1 of the reflection surface and the intersection point T1, and the surface of the facing portion 114 be 30 degrees or more, and it is desirable that the angle between the line L2, which connects the center point S2 of the reflection surface and the intersection point T1, and the surface of the facing portion 114 be 30 degrees or more.

Effects of the Invention

According to the production method for a leaf spring of the present invention, the durability of the leaf spring can be improved. In addition, the cutting of the leading end portion is unnecessary, so that the productivity can be improved and the production cost can be reduced.

BRIEF DESCRIPTION OF DRAWINGS

FIGS. 1A to 1C are side views which show a schematic construction of each processing of bending forming.

EXPLANATION OF REFERENCE NUMERALS

Reference numerals 110 and 120 denote a leaf spring, reference numerals 111 and 121 denote a leaf portion, reference numerals 112 and 122 denote an eye portion, reference numerals 113 and 123 denote a lead end portion, reference numeral 113A denotes an outside end point (leaf portion side end point), reference numeral 113B denotes an inside end point (end point opposite to the leaf portion side), reference numerals 114 and 124 denote a facing portion, reference numerals 115 and 125 denote a gap portion, reference symbol H1 denotes a perpendicular line, reference symbol G denotes an interval of the gap portion, reference symbol K denotes a region (facing portion surface), reference symbol L1 and L2 denote a line, reference symbol O denotes a center point of the eye portion, reference symbols S1 and S2 denote a center point of reflection surface, and reference symbol T1 denotes an intersection point.

EXAMPLES

The present invention will be explained hereinafter with reference to a specific example. In the example, effects by shot peening at an eye portion inner surface of a leaf spring were examined.

Figure 8A:
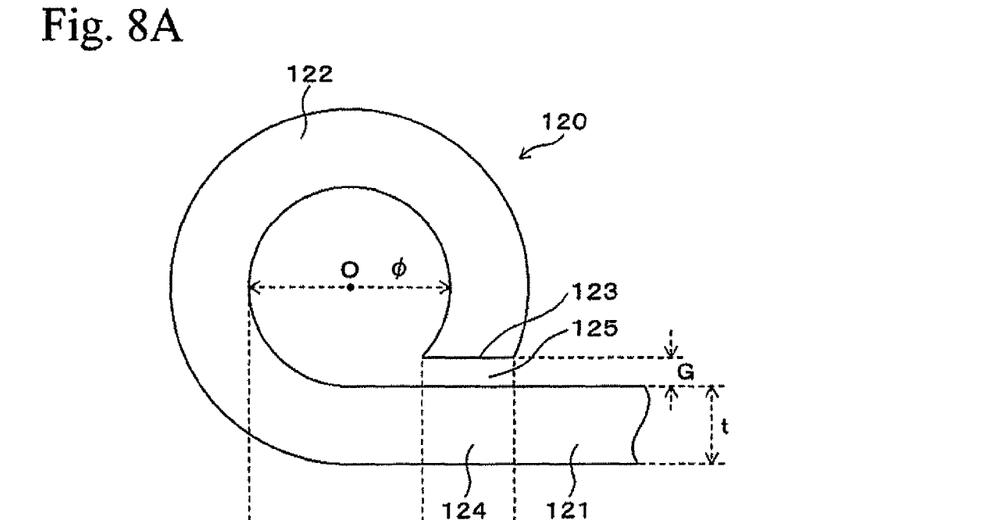
FIG. 8A is a diagram which shows an inner surface shape of an eye portion of a leaf spring produced in examples.

In the example, after an eye portion was formed by bending forming at an end portion of steel, the steel was subjected to quenching and tempering, and a leading end portion of the eye portion of leaf spring was subjected to working. Thus, as shown in FIG. 8A, a leaf spring 120 was produced such that a gap portion 125 was formed between a leading end portion 123 of the eye portion 122 and a facing portion 124.

The thickness t of the leaf spring 120 was set at 12.5 mm, the inner diameter φ of the eye portion 122 was set at 55 mm, and the width W of the leaf spring 120 was set at 70 mm. The leaf springs 120 in which the interval G of the gap portion 125 was set at 2.5 mm were used as comparative samples 11 and 12. The leaf spring 120 in which the interval G of the gap portion 125 was set at 7.0 mm was used as a comparative sample 13. The leaf spring 120 in which the interval G of the gap portion 125 was set at 7.5 mm was used as a sample 11 of the present invention. In the sample 11 and the comparative sample 13, the feature (in which the line L1, which connects the center point O of the eye portion 112 (the center point S1 of the reflection surface of the reflection member) and the intersection point T1, does not cross the leading end portion 113 of the eye portion 112) shown in FIG. 7B was set.

Next, warm stress shot peening was performed on an upper surface of a leaf portion 121 of each sample. Next, by using the shot peening apparatus 30 shown in FIG. 5, shot peening (hereinafter referred to as "inner surface shot peening (inner surface SP)") was performed on each inner surface of the eye portions 112 of the sample 11 and the comparative sample 12. In the inner surface shot peening, the reflection member 32 was disposed inside the eye portion 122, and the shots 33 were injected from the nozzle 31 to the reflection member 32. In this case, the reflection member 32 was moved in the axial direction in a condition in which the shots 33 were injected, so that the inner surface shot peening was performed on the inner surface of the eye portion 122 from the shot entrance side opening to shot exit side opening of the inner surface of the eye portion 3.

Figure 8B:
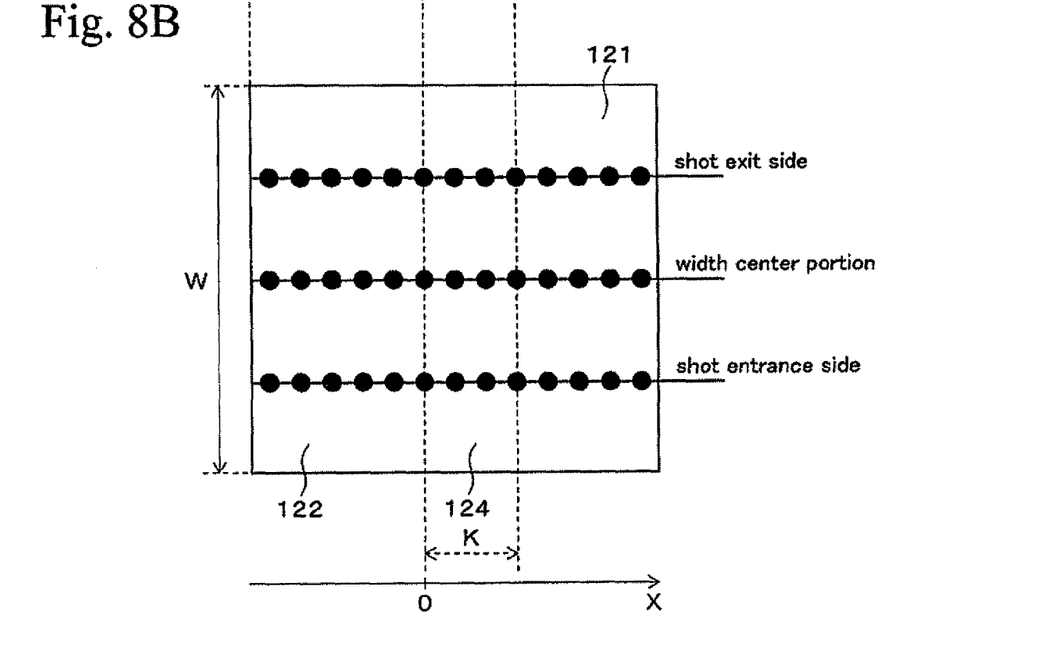
FIG. 8B is a diagram which explains a portion at which residual stress measurement was performed.
Figure 9:
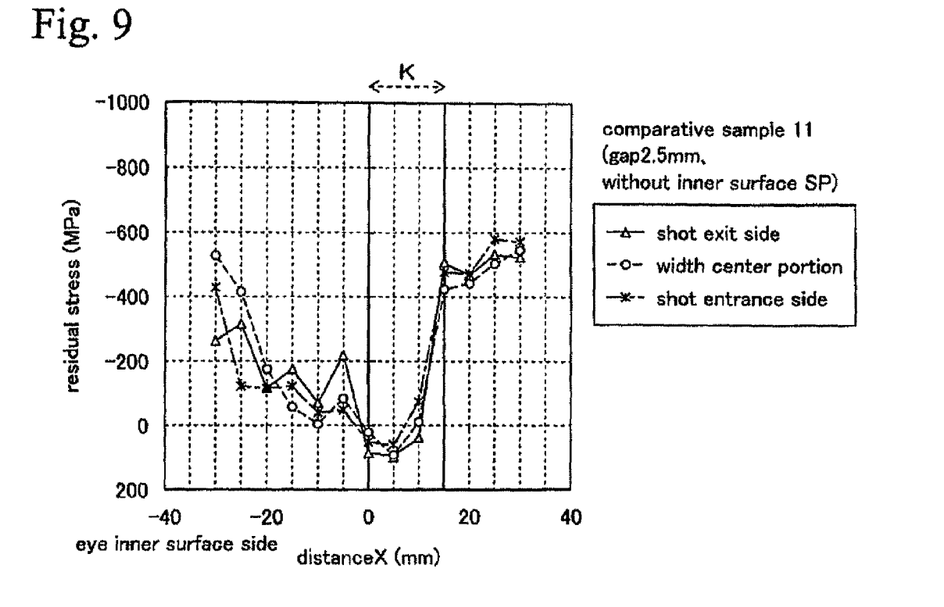
FIG. 9 is a graph which shows the residual stress measurement results of the comparative sample 11.
Figure 10:
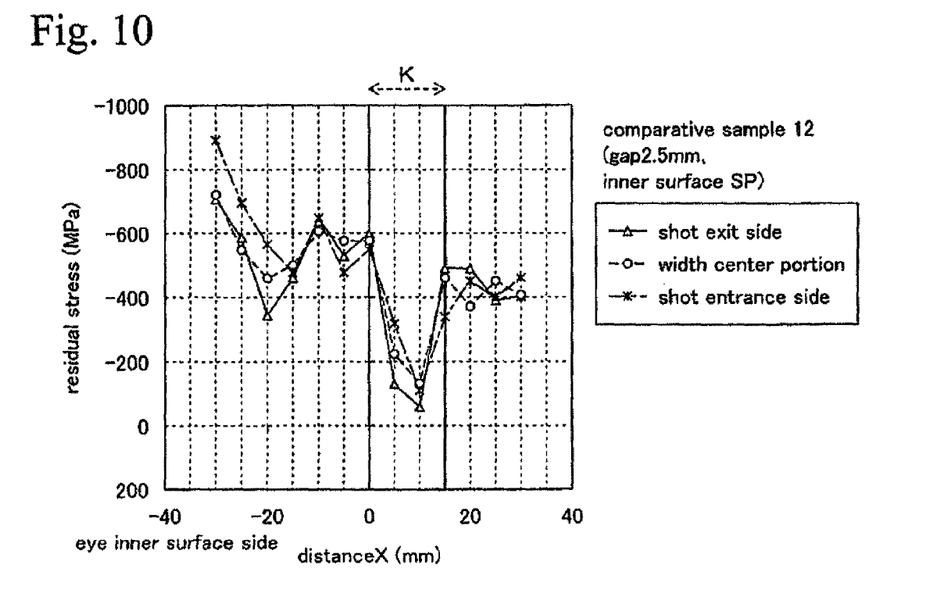
FIG. 10 is a graph which shows the residual stress measurement results of the comparative sample 12.
Figure 11:
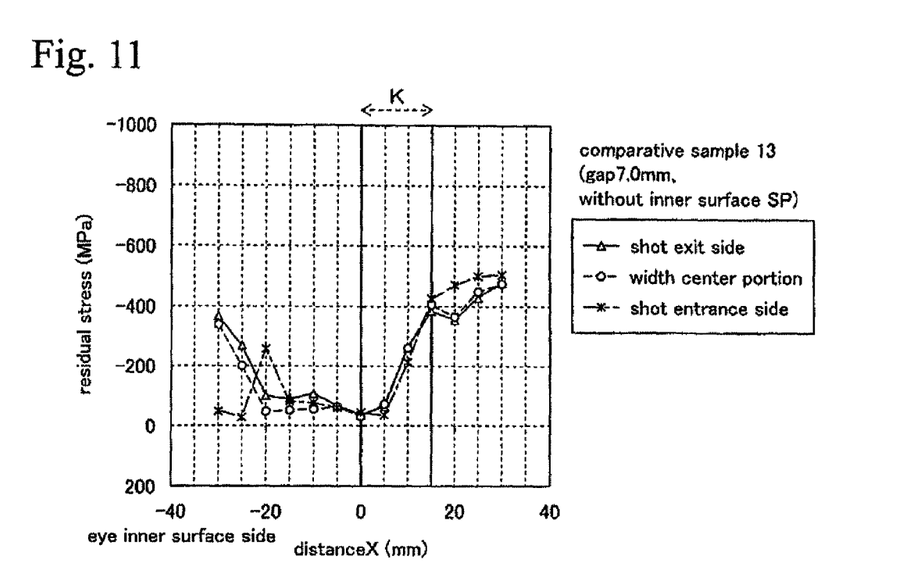
FIG. 11 is a graph which shows the residual stress measurement results of the comparative sample 13.
Figure 12:
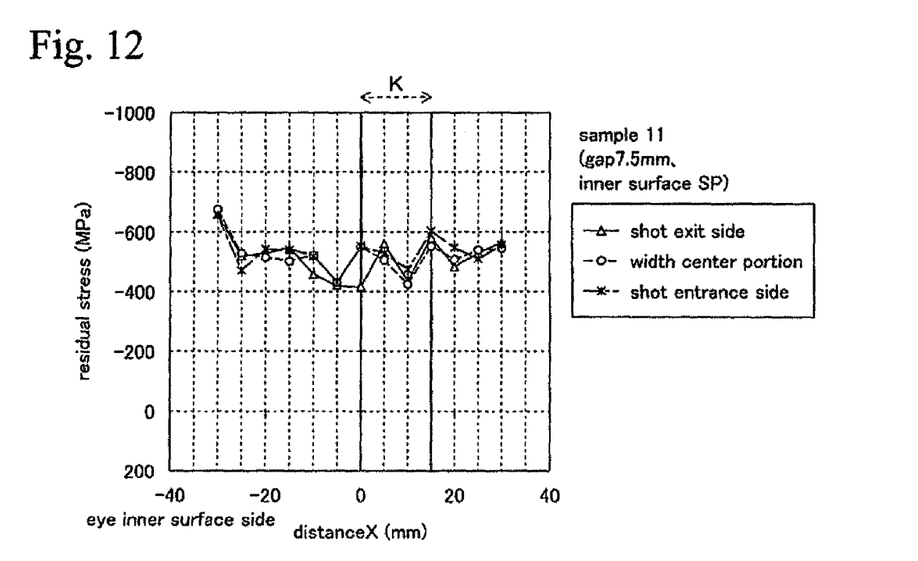
FIG. 12 is a graph which shows the residual stress measurement results of the sample 11 of the present invention.

Next, regarding the sample 11 and the comparative samples 11 to 13, residual stress measurements were performed on the region (in FIG. 8B) extending from the inner surface of the eye portion 122 to the leaf portion 121. Reference symbol "●" in FIG. 8B denotes a rough position of measurement point. The results are shown in FIGS. 9 to 12. FIG. 9 is a graph which shows the residual stress measurement results of the comparative sample 11. FIG. 10 is a graph which shows the residual stress measurement results of the comparative sample 12. FIG. 11 is a graph which shows the residual stress measurement results of the comparative sample 13. FIG. 12 is a graph which shows the residual stress measurement results of the sample 11 of the present invention. As shown in FIG. 8B, the distance X in FIGS. 9 to 12 denotes a distance obtained by using a point, which corresponds to the inside end point at the facing portion 124 of the eye portion 122, as the origin, and reference symbol K denotes a region (facing portion 124 surface) at which the gap portion 125 is formed.

As understood from FIGS. 9 and 10, in a case in which the comparative samples 11 and 12, in which the interval G was set at 2.5 mm which was equal to that of conventional product, are compared, the comparative sample 12 which was subjected to the inner surface shot peening was much higher in residual stress of inner surface side of the eye portion 122 than the comparative sample 11 which was not subjected to the inner surface shot peening. In the comparative sample 11, the residual stress was higher at the leaf portion 121 side, and the effects by the warm stress shot peening could be obtained. However, it was confirmed that in the comparative sample 11, the residual stress was greatly decreased from the leaf portion 121 side boundary of the region K to the eye portion 122 inner surface side, and the effects by the warm stress shot peening could not be obtained at the region K. In the comparative sample 12, in comparison with the sample 11, the residual stress at the eye portion 122 inner surface side was higher, and the effects by the inner surface shot peening could be obtained. However, it was confirmed that in the comparative sample 12, the residual stress was greatly decreased at the region K having the gap portion 125 formed thereat, and the effects by the inner surface shot peening could not be obtained at the region K.

As understood from FIGS. 11 and 12, regarding the comparative sample 13 and the sample 11 in which the interval G was set to be larger than that of conventional product, the sample 11 which was subjected to the inner surface shot peening was much higher in residual stress of inner surface side of the eye portion 122 than the comparative sample 13 which was not subjected to the inner surface shot peening. In addition, the sample 11 was much higher in residual stress of the region K having the eye portion 122 formed thereat than the comparative sample 13. It was confirmed that in the comparative sample 13, in comparison with the comparative sample 11, the residual stress was slightly higher at the region K, and the effects by the warm stress shot peening could be obtained. It was confirmed that in the sample 11, the residual stress was high uniformly from the leaf portion 121 to the eye portion 122 inner surface, a boundary portion between the region at which the effects by the warm stress shot peening could be obtained and the region at which the effects by the inner surface shot peening could be obtained was not emerged, and the shots were also sufficiently projected at the region K.

As described above, in the comparative sample 12 in which the interval G was set at 2.5 mm which was equal to that of conventional product, even when the inner surface shot peening was performed, the effects by the inner surface shot peening could not be obtained at the region K having the gap portion 125 formed thereat. In contrast, in the sample 11 of the present invention in which the relationship between the line and the leading end portion of the eye portion was set within the present invention, when the inner surface shot peening was performed, the effects by the inner surface shot peening could be sufficiently obtained at the region K having the gap portion 125 formed thereat. In addition, it was confirmed that the effects by the warm stress shot peening, which was performed on the upper surface of the leaf portion 121, could also be obtained at the region K.

The invention claimed is:

1. A production method for a leaf spring having a leaf portion and an eye portion formed at the leaf portion, comprising steps of:
   forming a gap portion between a leading end portion of the eye portion and a facing portion facing the leading end portion;
   shot peening an inner surface of the eye portion by disposing a reflection member, which has a reflection surface, inside the eye portion, injecting shots from a nozzle to the reflection member, and projecting the shots, which are reflected by the reflection surface of the reflection member, to the inner surface of the eye portion,
   wherein in the shot peening, the reflection surface is located at a cross section perpendicular to an axial direction of the eye portion such that a straight line does not cross the leading end portion of the eye portion, the straight line connecting an intersection point and a center point of the reflection surface of the reflection member, the intersection point being between a perpendicular line and a surface of the facing portion, the perpendicular line extending from a leaf portion side end point of the leading end portion of the eye portion to the facing portion, whereby shots are projected to the entire surface of the facing portion.

2. The production method for a leaf spring according to claim 1, wherein, at the cross section perpendicular to the axial direction of the eye portion, the center point of the reflection surface in the reflection member is positioned more proximate to the facing portion than a center point of the eye portion.

3. The production method for a leaf spring according to claim 1, wherein the reflection surface of the reflection member is conical.

4. The production method for a leaf spring according to claim 1, wherein, at the cross section perpendicular to the axial direction of the eye portion, the straight line connecting the intersection point and the center point of the reflection surface of the reflection member is inclined at an angle of 30 degrees or more with respect to the surface of the facing portion.

* * * * *